Nov. 22, 1955  C. F. QUIROLO ET AL  2,724,669
METHOD OF BENDING METAL PARTS
Filed Dec. 14, 1953  3 Sheets-Sheet 1

*INVENTORS*
CHARLES F. QUIROLO
WILLIAM F. THURBER
BY
ATTORNEY

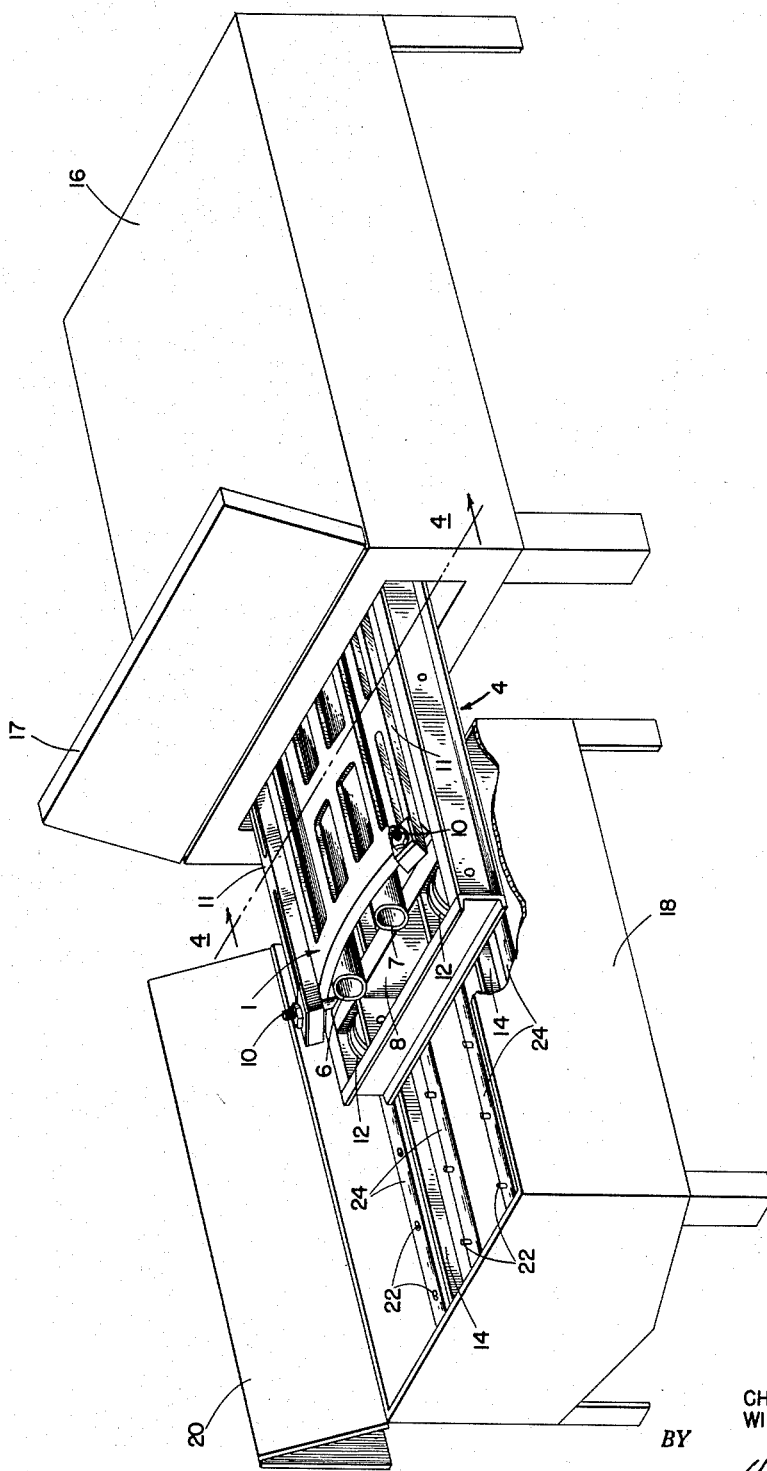

United States Patent Office 2,724,669
Patented Nov. 22, 1955

2,724,669

METHOD OF BENDING METAL PARTS

Charles F. Quirolo, West Los Angeles, and William F. Thurber, Lawndale, Calif., assignors to North American Aviation, Inc.

Application December 14, 1953, Serial No. 398,073

8 Claims. (Cl. 148—11.5)

This invention pertains to a method of forming whereby a permanent contour can be imparted to a workpiece by pre-stressing followed by a particular heating cycle.

It has become very difficult, if not impossible, to impart a desired curvature to certain complicated parts now used in industry. For example, an aircraft skin for a modern high-performance aircraft may be large enough in overall dimension to encompass a large portion of the wing of the aircraft, may be of varying thickness throughout, and may include stiffeners and reinforcements integrally machined therein. The very size of these parts makes forming in a press an impractical matter, to say nothing of the difficulty of obtaining an adequate die arrangement to impart the curvature to their irregular contour. It is possible to form certain of these parts on a power brake, but this method requires an expenditure of time which is prohibitive from a production standpoint. Also the parts which are so formed may have uneven curvature whereby they are not acceptable for their intended use.

It is therefore an object of this invention to provide a method for forming parts of all sizes and shapes.

An additional object of this invention is to form metal parts by a quick and economical method requiring small expenditures for equipment.

Still another object of this invention is to form sheet metal parts to a smooth curvature and with no appreciable sacrifice in strength.

A still further object of this invention is to form to a predetermined contour, in metal parts of a complexity which prohibits forming by any other method.

These and other objects will become apparent from the following detailed description taken in connection with the accompanying drawings in which Fig. 1 is a perspective view of a typical unformed workpiece;

Fig. 3 is a perspective view of the jig, oven, and quenching arrangement used during forming;

Figure 1:
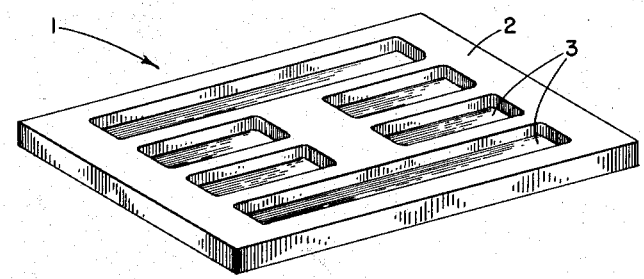
Figure 2:
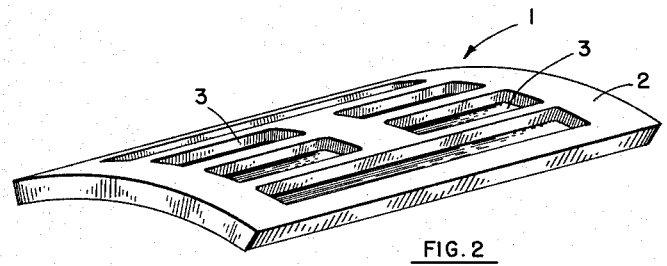
Fig. 2 is a perspective view of the workpiece of Fig. 1 after forming.

Fig. 1 illustrates a workpiece 1 which may include heavier reinforcing portions 2 and relieved cutout sections 3 of various sizes. Such a part for use on an aircraft would normally be of an aluminum alloy or perhaps titanium. 75S aluminum alloy is widely used and the example to be given refers to a workpiece of this material. This alloy contains 1.6% copper, 2.5% magnesium, 5.6% zinc, and 0.3% chromium. It may be necessary to impart to workpiece 1 a curvature such as illustrated in Fig. 2 in obtaining a completed part. Workpiece 1 may have quite large lateral dimensions whereby it is impractical to form the part in a conventional press or by any previously known method.

Figure 4:
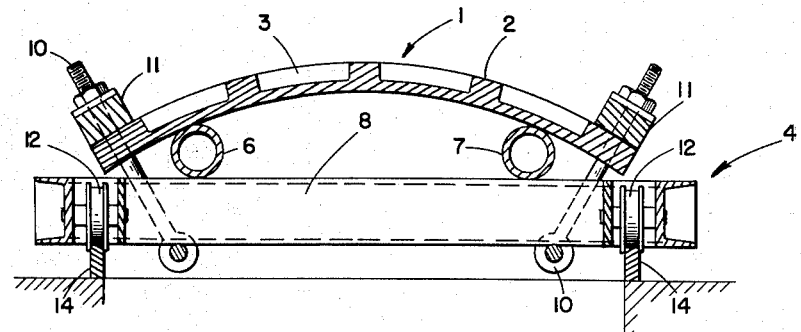
Fig. 4 is a sectional view taken along line 4—4 of Fig. 3.

According to the provisions of this invention, in a typical example, workpiece 1 is clamped on a jig 4 in a manner to give the workpiece a curvature exceeding that required for the finished part. Nevertheless in the normal case the elastic limit of the workpiece material will not have been exceeded and the part would accordingly spring back to its original shape if it were released immediately from the jig. The jig includes contour imparting bars 6 and 7 suitably mounted on a base 8, the contour bars engaging the under surface of the workpiece. Eye bolts 10 may also be secured to the base and engage clamping bars 11, which are in turn in engagement with the workpiece on either side of the upper surface thereof. Obviously by tightening up on bolts 11 the workpiece is bowed, as illustrated best in Fig. 4, so that an initial curvature is imparted thereto. In some cases for a fully heat treated workpiece of 75S aluminum alloy this curvature may be from about three to five times that desired for the completed part. Jig 4 includes rollers 12 which engage rails 14 and enable the jig to be conveniently rolled into position within a furnace 16, which may best be seen in Fig. 3. With the workpiece within the furnace and the door 17 thereof closed, the workpiece is then heated to a temperature of around 300° F. for approximately one hour. Following this the jig is rolled from the oven to a quenching tank 18 and door 20 thereof is closed over the top of the workpiece and jig. No fluid is initially within the tank but after the workpiece is in the position as described, water is sprayed against the underneath side thereof from a plurality of water dispersing nozzles 22 connected with pipes 24. This cools the part from the concave side. After the temperature of the workpiece has been lowered it is unclamped and removed from the jig. It will be found that when this workpiece is released following the above outlined procedure it will spring back to a certain extent, but not to its original flat shape. Instead, it will have a contour such as that of the part of Fig. 2 which is permanently imparted thereto.

Figure 5:
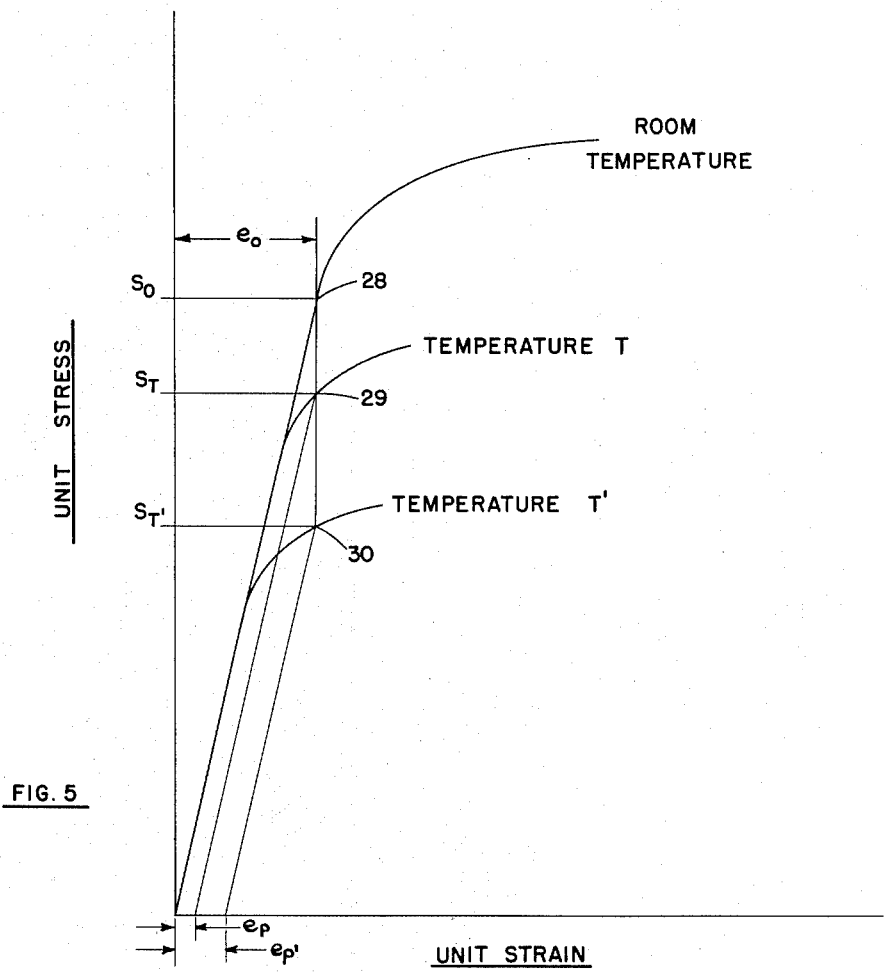
Fig. 5 is a graph illustrating the stress-strain relationship of a workpiece formed by the method of this invention.

The reasons for this phenomenon may best be understood by reference now to Fig. 5. This figure illustrates a typical stress-strain relationship for an aluminum alloy. When the workpiece is initially clamped on jig 4 so that a curvature is imparted thereto a certain amount of stress will be induced in the part, which may be represented on the graph as $S_o$. At the same time a strain will be induced in the part which is $e_o$, thereby placing the condition of the part at point 28 on the room temperature curve. It may be observed that this point is below the portion of the curve that breaks at the elastic limit of the material, so that at point 28 there has been no permanent deformation given the workpiece. Such a stress-strain value will vary with the particular workpiece but may occur, in typical examples, at three to five times the curvature desired for the finished part.

The next step in the procedure is to heat the workpiece, which in the example given for 75S aluminum alloy was to the temperature of 300° F. This could be accomplished in a furnace as illustrated, or by any other feasible means. It is characteristic of aluminum and its alloys that when the temperature is so elevated the stress-strain curve will change. The initial slope of the curve is the same, but the elastic limit of the material is considerably lower. The curve of temperature T represents the characteristics of the material at such an elevated temperature. The material of the workpiece will lose strength at elevated temperature so that the stress therein may now be of value $S_t$, which is below that originally given the workpiece when secured to the jig. However, the strain remains constant because the workpiece is clamped firmly in place on the jig and does not change curvature regardless of the increase in temperature. This means that the condition indicated at point 29 then exists whereby the lowered stress in the workpiece nevertheless exceeds the new elastic limit of the material, and point 29 is on the portion of the curve beyond the elastic limit. As a result, when the part is subsequently cooled a permanent deformation is realized, which is indicated by $e_p$ on the unit strain scale of the graph. Therefore, when the part is released from the jig it will spring back from the strain of $e_o$ to strain $e_p$, whereby the permanent curvature of the part of Fig. 2 is obtained.

If the aluminum alloy workpiece is heated to any even greater temperature, its elastic limit will be lowered below the value indicated by the temperature T curve. Thus, for example, if the workpiece is heated to 350° F. the stress will be lowered to the value $S_t'$, but the strain will, of course, remain the same as that originally given the part. Point 30 will then indicate the condition of the workpiece at the elevated temperature, which is even further past the elastic limit of the material than was point 29 for the lower temperature condition. Therefore, a greater permanent set will be obtained, indicated by $e_p'$, so that the part will have an even sharper curvature when released from the jig.

It can be observed, therefore, from an examination of the graph of Fig. 5, that the amount of forming which will take place when this method is followed depends upon the initial curvature which is given the workpiece, which thus determines the initial stress and strain, and upon the temperature to which the part is heated. These factors may be balanced so that a desired predetermined amount of curvature can be given a finished part.

When the part has been removed from the oven following its heating period it is quenched which facilitates handling. This may also prevent overaging which could occur in the part from being maintained too long at temperature.

Various other factors must be considered in obtaining optimum consistent forming with maximum strength properties for the completed part. As an example, 75S aluminum alloy is commercially obtainable in either a T6 or W condition. In the latter condition the material has been solution heat treated but has not be subjected to an aging process. T6 material, however, is in a fully heat treated state and no further aging is necessary. Obviously, therefore, if T6 material is selected there will be no further heat treatment required when the part is removed from the jig following its heating at a prestressed condition. However, there are some disadvantages to using T6 material because at most forming temperatures a slight loss in strength will result. It has been found that when 75S material is heated to a temperature of 350° F. for a period of one hour there will be about a 7% loss in strength in the part when it is subsequently cooled and removed from the jig. At 300° F. for an hour, approximately 3.5% loss in strength occurs. If the forming temperature is lowered to 275° F. there will be practically no loss in strength, but of course not as much forming is possible at that temperature as for the higher temperatures because the elastic limit will not be reduced a comparable amount. Accordingly, it is preferable to form 75S-T6 material at not over about 375° F. in order to minimize loss in properties. Also, temperatures under about 250° F. will not lower the elastic limit sufficiently for most forming of this type.

W material can be simultaneously formed and aged which has the distinct advantage of resulting in no loss of strength of the material which is used. However, this is a time consuming proposition. Typical aging cycles may involve subjecting the part to a temperature of 250° F. for twenty-four hours, or for three hours at 240° F., followed by three more hours at 325° F. From a production standpoint this naturally limits the amount which can be produced by given equipment. For forming W material, the workpiece is simply clamped in the usual manner to provide an initial stress, and then subjected to the desired aging cycle. The elevated temperatures encountered during this procedure will lower the elastic limit of the material so that a permanent curvature will result.

Another consideration in obtaining the best possible results involves the amount of time at which the part is subjected to temperature. When forming a workpiece of 75S-T6 material at 350° F. the room temperature properties of the material will drop off sharply within the first five minutes of the temperature condition, but no further appreciable reduction in properties occurs with continued heating. In fact, after about forty-five minutes there will be a slight rise so that better strength of the completed part will be obtained. After two hours at this temperature a further decrease in properties is noted and no rise can be realized with prolonged heating. Therefore, for forming at 350° F. it is preferable to leave the part in the furnace from around forty-five minutes to two hours. When forming at the lower temperature of 275° F. there is little or no change in room temperature properties when the part is first heated, but after extended periods of time in the furnace the properties may begin to fall off. Generally speaking, the time range for fully heat treated aluminum alloys is from five minutes to four hours.

Another consideration here is the fact that while at temperature the elastic limit of the material will continue to drop. Therefore, heating at a relatively low temperature for considerable time may achieve the same amount of permanent forming of the workpiece as will be obtainable at a higher temperature for a shorter period of time. Point 30 on the graph of Fig. 5 could therefore represent the condition at the lower temperature T held for a longer period of time, as well as higher temperature T' for a shorter duration. Again it is necessary to balance the advantages and disadvantages of the different conditions to obtain desired amount of forming, and adequate strength properties.

Figure 6:
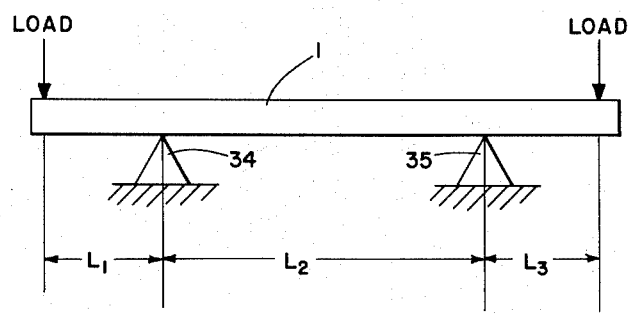
Fig. 6 is a schematic view indicating optimum jig arrangement for parts of constant curvature.

Of course the jig used may be given a more or less complex design depending upon the part which is being formed. When an even curvature is required, such as an arc of a circle, the loading on the part in its prestressed condition should be as even as possible throughout the entire portion to be given this curvature. If the beam of Fig. 6 is regarded as a workpiece to be formed, and it is desired to obtain a constant curvature throughout portion $L_2$ thereof, by the basic laws of mechanics the workpiece should be supported at points 34 and 35, while loads are applied to the extremities of the workpiece. With $L_1$ equal to $L_3$ this will provide an even amount of stress throughout the entire length of $L_2$ and this portion will be given an even curvature. Of course, variations in stress from loading of other types may be taken advantage of in forming parts of complex curvature. Some portions may be given a curvature which will carry them well beyond the elastic limit while at elevated temperature, while others with less load will be taken a lesser degree beyond the elastic limit, and still other portions may remain at all times within the elastic limit and not formed at all. It is not all detrimental if the workpiece is given an initial stress which exceeds the elastic limit at room temperature. This merely means that relatively sharp curvatures may be more easily obtained than if the initial stress is lower.

Thinner portions of a workpiece, such as at relieved sections 3 of workpiece 1, may not be stressed sufficiently to exceed the elastic limit of the material when at temperature, even though the stress is heavier portions 2 exceeds such value. This does not prevent forming because the heavier sections will hold the lighter sections to the curved contour.

Figure 7:
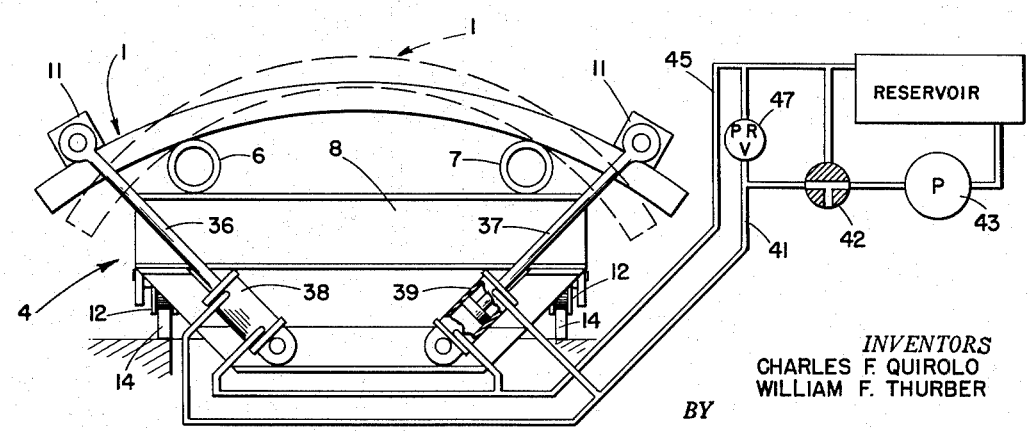
Fig. 7 is a sectional view of a modified jig design.

Although it is the usual procedure to clamp the workpiece in place on the fixture so that the strain therein remains constant as it is heated to an elevated temperature, it is also possible to vary the strain during the heating period. This may be accomplished by the modification of Fig. 7. The jig itself may be generally similar to that illustrated in Figs. 3 and 4. However, eyebolts 10 are replaced by piston rods 36 and 37 which connect with pistons disposed in cylinders 38 and 39. These may be hydraulic cylinders of conventional design having inlet lines 41 connecting through three-way valve 42 to pump 43. The cylinder outlet lines 45 lead to the reservoir which supplies the pump. The workpiece may be secured to the jig and given a predetermined stress and strain by admitting pressurized fluid into the hydraulic cylinders. The jig is then inserted in the oven for heating the workpiece. After the workpiece has been heated, whereby its strength is lowered, the pressure within the cylinders will be sufficient to force the pistons downwardly and increase the curvature of the workpiece, to the position shown in phantom in Fig. 7. In other words, instead of the stress in the workpiece becoming lower as the workpiece is heated, it may be maintained at a constant or nearly constant value while the strain becomes greater as the curvature imparted to the workpiece increases. Pressure relief valve 47 may be included between the inlet and outlet lines to assure a constant pressure within cylinders 40 and 41 so that the desired stress in the workpiece is maintained. It would be possible, of course, to increase the stress to a higher value where particularly sharp curvatures are required, or to reduce the stress slightly from its original value. The higher the stress the greater will be the permanent deformation of the part because the elastic limit will be exceeded by a larger amount and more permanent strain will result. This modification is particularly applicable where the workpiece is of such a nature that at room temperature little or no curvature can be imparted thereto without cracking the material. It may be possible, therefore, for the workpiece to have no contour prior to its heating period with all the curvature being imparted thereto after it has attained a higher temperature and is more easily bent, without danger of damage to the part.

The above detailed description has been directed to the use of 75S aluminum alloy, but the method of this invention is not restricted to such material. Any material which will have a lower elastic limit when subjected to temperature can be given a permanent curvature if it is first over-formed and held, as disclosed above. All of the aluminum alloys possess this characteristic, and titanium is another metal which is particularly adaptable to the process disclosed herein. The particular temperatures and amount of stress to be induced in the part may vary with the material selected, but the principle remains the same. The important feature is to give the workpiece a curvature exceeding that required for the finished part, and great enough in magnitude so that at elevated temperature the stress of the material will fall beyond the elastic limit so that a permanent set will be achieved. When this is done an even curvature can be obtained and the workpiece normally will not suffer appreciable loss in properties. Large, complex parts can be formed when no other methods are satisfactory. At the same time this forming method does not take excessive time and requires a very minimum investment in tooling. It is a very simple matter to change the amount of curvature obtained in a completed part by altering the amount of initial curvature obtained when it is clamped over the forming members.

The foregoing detailed description is to be clearly understood as given by way of illustration and example only, the spirit and scope of this invention being limited only by the appended claims.

We claim:

1. The method of providing a contoured part comprising the steps of heating an unformed metal workpiece sufficiently to lower the elastic limit thereof while simultaneously maintaining a substantially constant bending stress therein sufficient to impart a curvature thereto greater than that required for a completed part and sufficient to exceed the elastic limit of said workpiece when so heated, cooling said workpiece, and releasing said workpiece whereby said workpiece springs back to a permanently imparted contour.

2. The method of providing a contoured aluminum alloy part comprising the steps of deforming an aluminum alloy workpiece by bending so as to induce a stress and strain therein and to exceed in curvature the contour to be given said part, simultaneously heating said workpiece to between approximately 250° F. and 375° F. for a sufficient time to lower the elastic limit thereof below the value of said induced stress, cooling said workpiece, and releasing said workpiece whereby said workpiece springs back to a permanently imparted contour.

3. The method of providing a part of predetermined contour comprising the steps of bending an unformed metal workpiece to a contour having a curvature in excess of that required for a finished part, simultaneously subjecting said workpiece to a temperature sufficient to lower the elastic limit thereof to a value below the stress induced therein by reason of such bending, whereby a permanent deformation of said workpiece is obtained, cooling said workpiece, and releasing said workpiece whereby said workpiece springs back to a permanently imparted contour.

4. The method of providing a part of predetermined contour comprising the steps of bending an unformed metal workpiece to a contour in excess of that required for a finished part and holding said workpiece so bent thereby subjecting said workpiece to a stress and strain, simultaneously heating said workpiece sufficiently to lower the elastic limit of the material thereof below the stress therein at such temperature, and subsequently releasing said workpiece whereby said workpiece springs back to a contour intermediate the contour imparted thereto and its unformed state.

5. The method of providing a formed part comprising the steps of bending a metal workpiece to a curvature exceeding that required for a completed part thereby inducing a stress and strain in said workpiece, heating said workpiece sufficiently to lower the elastic limit thereof to a value below the induced stress in said workpiece at said temperature, while maintaining a constant strain on said workpiece by reason of said bending, cooling said workpiece, and releasing said workpiece whereby said workpiece assumes a permanent curvature less than that originally imparted thereto.

6. The method of forming an aluminum alloy part comprising the steps of bending an unformed fully heat treated aluminum alloy workpiece to a curvature greater than required for a finished part, heating said workpiece while so bent to a temperature in the range of from about 250° F. to 375° F., maintaining said workpiece at said temperature for more than approximately five minutes and less than approximately four hours whereby the elastic limit of said aluminum alloy is lowered to a value below the stress induced therein by said bending, cooling said workpiece, and releasing said workpiece whereby said workpiece springs back to a position of permanent curvature.

7. The method of providing a contoured part comprising the steps of inducing a stress and strain in a metal workpiece by bending said workpiece to a contour having a curvature in excess of that required for a finished part, heating said workpiece to an elevated temperature and for a period of time sufficient to lower the elastic limit thereof to a value lower than the induced stress in said workpiece at such elevated temperature, and without substantially affecting the room temperature strength properties thereof, cooling said workpiece, and releasing said workpiece whereby said workpiece springs back to a permanently imparted contour less than that given by reason of said bending.

8. The method of providing a fully formed heat treated aluminum alloy part comprising the steps of bending to a curvature greater than required for a finished part a workpiece of solution heat treated aluminum alloy material, subjecting said workpiece to an aging cycle which includes heating said workpiece to a temperature sufficient to lower the elastic limit of said material below the stress therein resulting from said bending, cooling said workpiece, and releasing said workpiece whereby said workpiece assumes a permanent curvature less than that imparted thereto by reason of said bending.

References Cited in the file of this patent

UNITED STATES PATENTS

| | | |
|---|---|---|
| 2,449,428 | Timmons | Sept. 14, 1948 |
| 2,527,983 | Brown et al. | Oct. 31, 1950 |